US012796613B2

(12) United States Patent
John et al.

(10) Patent No.: US 12,796,613 B2
(45) Date of Patent: Nov. 17, 2026

(54) AGRICULTURAL MANIPULATOR; ASSEMBLY THEREOF WITH A ROBOT ARM

(71) Applicant: Viscon Group Holding B.V., 's-Gravendeel (NL)

(72) Inventors: Renji Kuncheria John, Delft (NL); Bart Van Duijn, Delft (NL); Pranshu Tople, Delft (NL)

(73) Assignee: VISCON GROUP HOLDING B.V., 'S-Gravendeel (NL)

( * ) Notice: Subject to any disclaimer, the term of this patent is extended or adjusted under 35 U.S.C. 154(b) by 333 days.

(21) Appl. No.: 18/579,973

(22) PCT Filed: Jul. 19, 2022

(86) PCT No.: PCT/NL2022/050421
§ 371 (c)(1),
(2) Date: Jan. 17, 2024

(87) PCT Pub. No.: WO2023/003460
PCT Pub. Date: Jan. 26, 2023

(65) Prior Publication Data

US 2024/0237583 A1 Jul. 18, 2024

(30) Foreign Application Priority Data

Jul. 19, 2021 (NL) ...................................... 2028781

(51) Int. Cl.

| | |
|---|---|
| ***A01D 46/30*** | (2006.01) |
| ***B25J 15/02*** | (2006.01) |
| ***B25J 19/02*** | (2006.01) |

(52) U.S. Cl.
CPC ............ *A01D 46/30* (2013.01); *B25J 15/024* (2013.01); *B25J 19/023* (2013.01)

(58) Field of Classification Search
CPC ....... A01D 46/30; B25J 15/024; B25J 19/023; B25J 15/0213
See application file for complete search history.

(56) References Cited

U.S. PATENT DOCUMENTS 11,363,757 B2 * 6/2022 Wisdom .................. G01S 19/39
11,439,065 B2 * 9/2022 Wisdom ................. B25J 9/0084
(Continued)

FOREIGN PATENT DOCUMENTS

CN 106363618 2/2017
CN 108481353 9/2018
(Continued)

OTHER PUBLICATIONS

International Search Report and Written Opinion in International Application No. PCT/NL2022/050421, mailed on Sep. 26, 2022, 15 pages.

*Primary Examiner* — Nicole Coy
(74) *Attorney, Agent, or Firm* — KDW Firm PLLC

(57) ABSTRACT

An agricultural manipulator, configured to perform agricultural processing from a group, at least including harvesting and pruning. The manipulator includes—a carrier, a connector arranged on the carrier and configured to connect the manipulator to a robot arm, and at least one manipulating device on the carrier from a group, at least comprising a gripper and a cutter. An assembly of such a manipulator with a robot arm, in particular an industrial robot arm.

19 Claims, 3 Drawing Sheets

(56) References Cited

U.S. PATENT DOCUMENTS

| | | | | |
|---|---|---|---|---|
| 11,700,789 | B2 * | 7/2023 | Wisdom | G06T 7/0012 |
| | | | | 47/1.43 |
| 11,768,187 | B2 * | 9/2023 | Wisdom | G01C 21/20 |
| | | | | 56/327.1 |
| 12,484,480 | B2 * | 12/2025 | Rossi | A01D 46/24 |
| 2021/0368680 | A1 * | 12/2021 | Wisdom | A01D 46/30 |
| 2023/0354747 | A1 * | 11/2023 | Chavasse | A01D 46/30 |

FOREIGN PATENT DOCUMENTS

| | | |
|---|---|---|
| CN | 108582127 | 9/2018 |
| EP | 3539735 | 9/2019 |

* cited by examiner

AGRICULTURAL MANIPULATOR; ASSEMBLY THEREOF WITH A ROBOT ARM

This application is a national stage filing under 35 U.S.C. 371 of pending International Application No. PCT/NL2022/050421, filed Jul. 19, 2022, which claims priority to Netherlands patent application 2028781, filed Jul. 19, 2021, the entirety of which applications are incorporated by reference herein.

The present disclosure relates to an agricultural manipulator. The manipulator is configured for harvesting, pruning and any other agricultural processing.

In agriculture there's a movement in the direction of the use of machines instead of labour. Existing machines are most often dedicated configurations, designed from the ground up, which is accompanied by high investments and long development times, while initially marketed machines have often proven too slow and/or inaccurate to replace labour.

According to the present disclosure, and agricultural manipulator is provided, which is configured to perform agricultural processing from a group, at least comprising harvesting and pruning, and comprises:

- a carrier;
- a connector arranged on the carrier and configured to connect the manipulator to a robot arm; and
- at least one manipulating device on the carrier from a group, at least comprising a gripper and a cutter.

Although it may appear that distinct manipulating devices may be intended, it is noted that integrated embodiments may be feasible. For example, above, a gripper and a cutter are specifically mentioned as distinct manipulating devices, but a gripper may comprise a cutting edge to enable a function of gripping a portion of a plant, and—when firmly gripped—the cutting edge on or of the gripper may cut the plant portion off the plant to extract a cut portion from the plant.

The agricultural manipulator may be combined with a robot arm, which embodies proven technology and allows the manipulator to be oriented in any desired directivity for a selected task, such as harvesting, deleafing, and pruning, but not limited to these tasks, and consequently more and other manipulating devices may be arranged on the carrier than the mentioned gripper and cutter.

Readily available robot arms have surprisingly proven to be able to provide a reliable and versatile platform, in particular industrial robot arms, for an agricultural manipulator according to the present disclosure, in that desired degrees of freedom can be achieved thereby, for orienting/directing manipulating devices of the agricultural manipulator according to the present disclosure. Thus approach to, retraction from and processing steps on stems, branches, leaves, prunes, produce for harvesting and the like are readily achievable with the manipulator when provided with a platform of a robot arm.

The present disclosure encompasses many embodiments which may be disclosed in the embodiment description below and/or may be defined in appended dependent claims, or may comprise obvious alternatives for claimed features.

For example, in a possible embodiment, the gripper comprises gripper elements of which at least one is moveable relative to the carrier and relative to the other of the gripper elements, to selectively grip, when in a closed position, or release, when in an open position, a portion of a plant between gripping portions of the gripper elements.

The carrier may comprise a gripper drive connected to the at least one gripper element, that is moveable relative to the other of the clamp elements.

More than one of the gripper elements may be moveable relative to the carrier.

An agricultural manipulator with a gripper drive and more than one of the gripper elements being moveable relative to the carrier, the drive may be connected to one of the gripper elements that is movable relative to the carrier, wherein a transmission is arranged between the gripper element that is connected to the drive and at least one other gripper element that is also movable relative to the carrier.

The at least one gripper element, that is moveable relative to the carrier, may be connected to the carrier in a connection from a group, at least comprising: a rotation shaft, pivot, and a slide mechanism.

The gripper elements may be curved to define a space there between, when in the closed position.

The carrier may comprise a cutter drive connected to the cutter.

In an embodiment with curved gripper elements and a cutter drive for the cutter, the cutter drive may be connected with the cutter through the space between the curved gripper elements.

The cutter may be mounted on the carrier through a translation mechanism, configured to selectively advance the cutter towards or withdraw the cutter from the gripping portions of the gripper elements.

The translation mechanism is configured to advance the cutter towards or withdraw the cutter from the gripping portions of the gripper elements over sides of the gripper elements.

The cutter may comprise a rotary cutter blade.

The agricultural manipulator may further comprise an image capturing device and a processor, connected with at least one of the gripper and the cutter, and configured to control operation of the at least one of the gripper and the cutter based on captured images acquired through the image capturing device. Herein, an image capturing device may capture any type or kind of image, on the basis of which the manipulator or a processor may detect a position of a portion of a plant for processing, which is to say that depth images and/or any other kind or type data are encompassed within the expression of "an image", that enables the processing functions to be executed on selected portions of plants.

The present disclosure also relates to an assembly of an agricultural manipulator and a robot arm comprising a robot arm controller, wherein the manipulator is mounted on the robot arm via the connector arranged on the carrier.

The assembly may exhibit the features that the robot arm may be an industrial robot arm.

The assembly may exhibit the features that the image capturing device may be mounted on the robot arm.

The assembly may exhibit the features that the processor may be incorporated in the robot arm controller.

The assembly may exhibit the features that the robot arm controller may be positioned remote from the assembly.

Based on the above indications of features of embodiments of the present disclosure in terms of the appended claims, below an embodiment description is provided with reference to the appended drawing, where the scope of protection of the present disclosure according to the appended claims is by no means limited to any specific aspect or feature of the below discussed and in the drawing shown embodiments. Such exemplary embodiments are shown in the accompanying drawing, which shows distinct embodiments wherein the same or similar elements, components and/or aspects can be designated with the same or a similar reference numeral, and in which:

Figure 1:
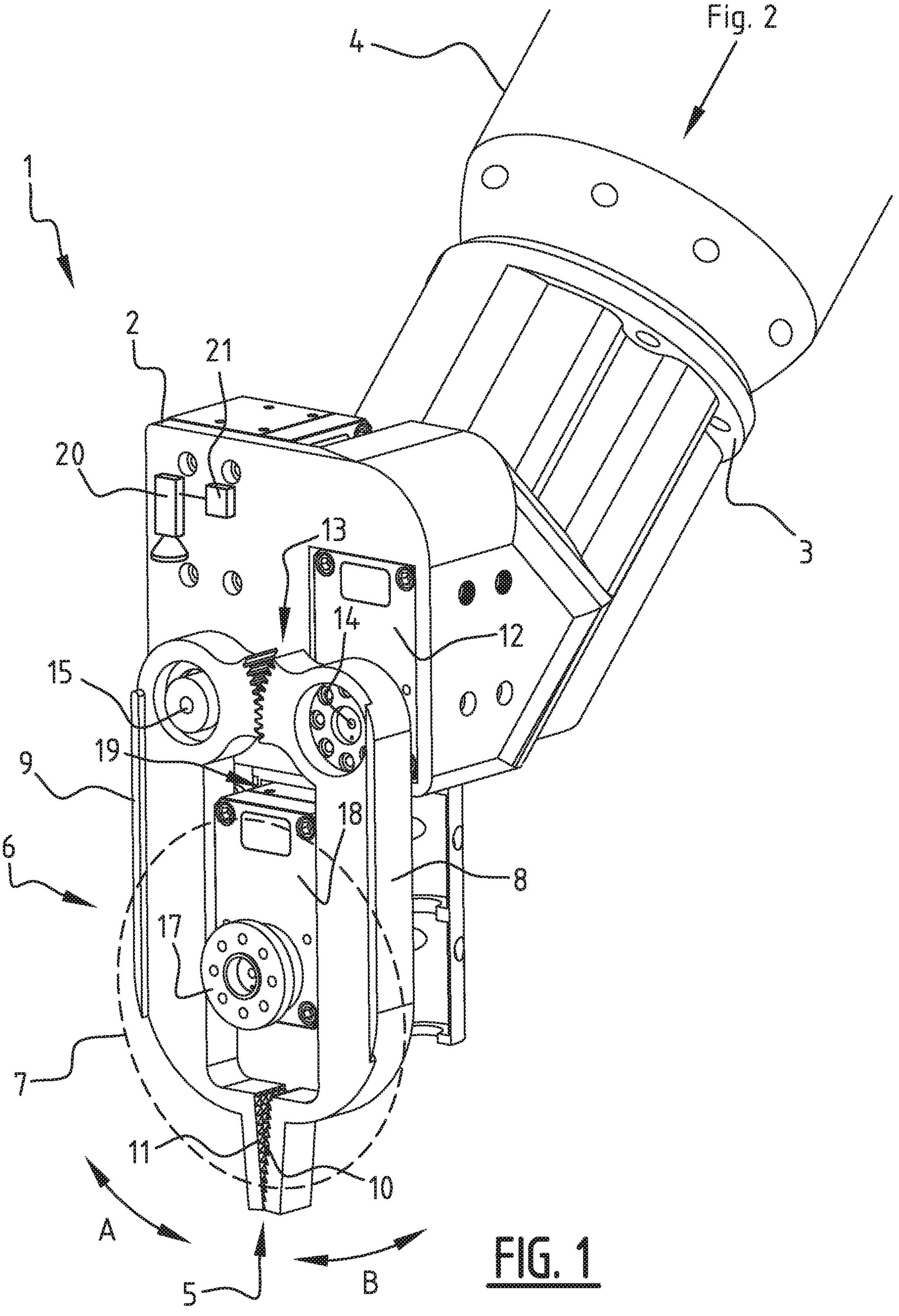
FIG. 1 shows a schematic and perspective view of an agricultural manipulator and assembly thereof with a robot arm, according to the present disclosure.
Figure 2:
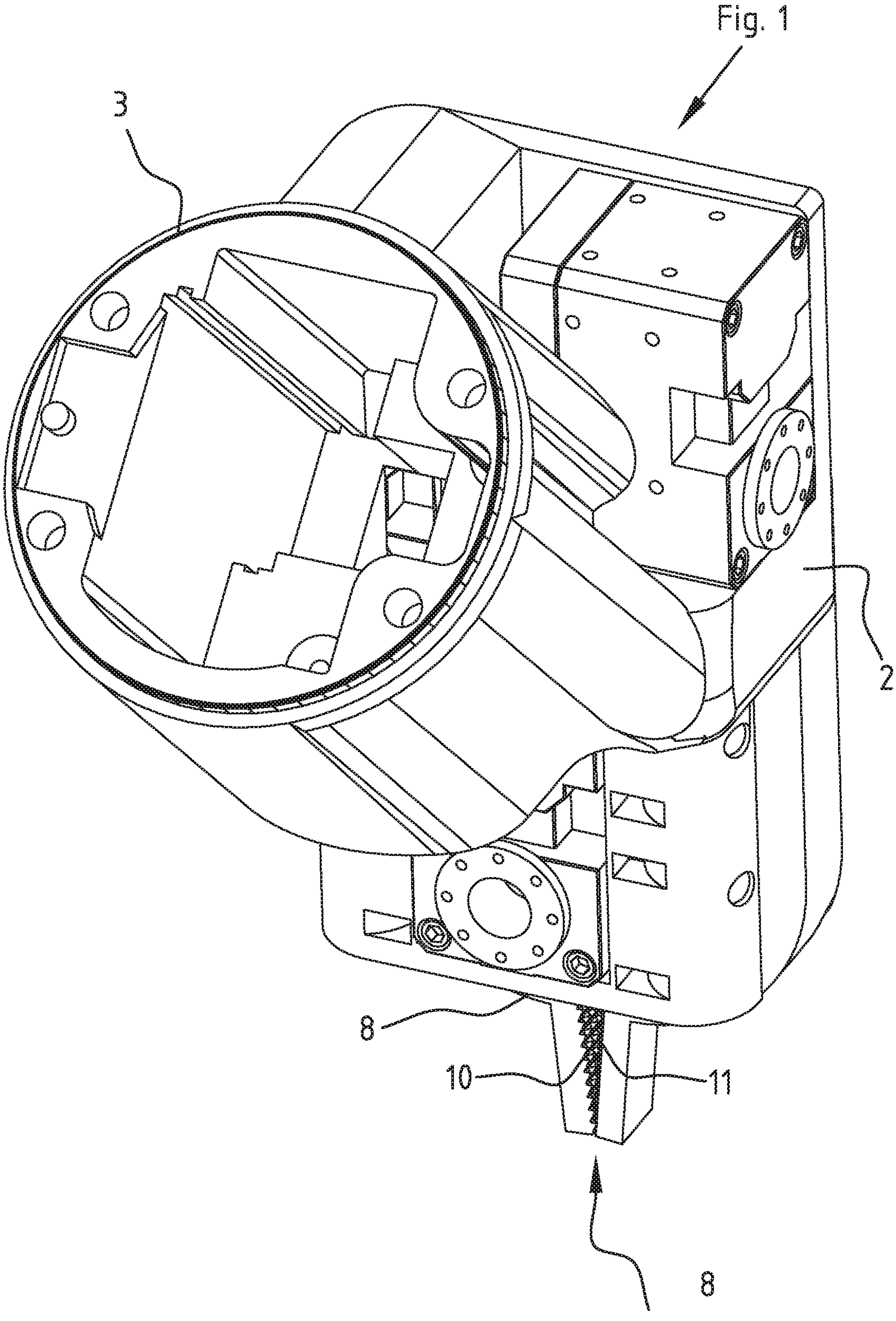
FIG. 2 shows a schematic and perspective view of the agricultural manipulator of FIG. 1 from behind (arrow II in FIG. 1)
Figure 3:
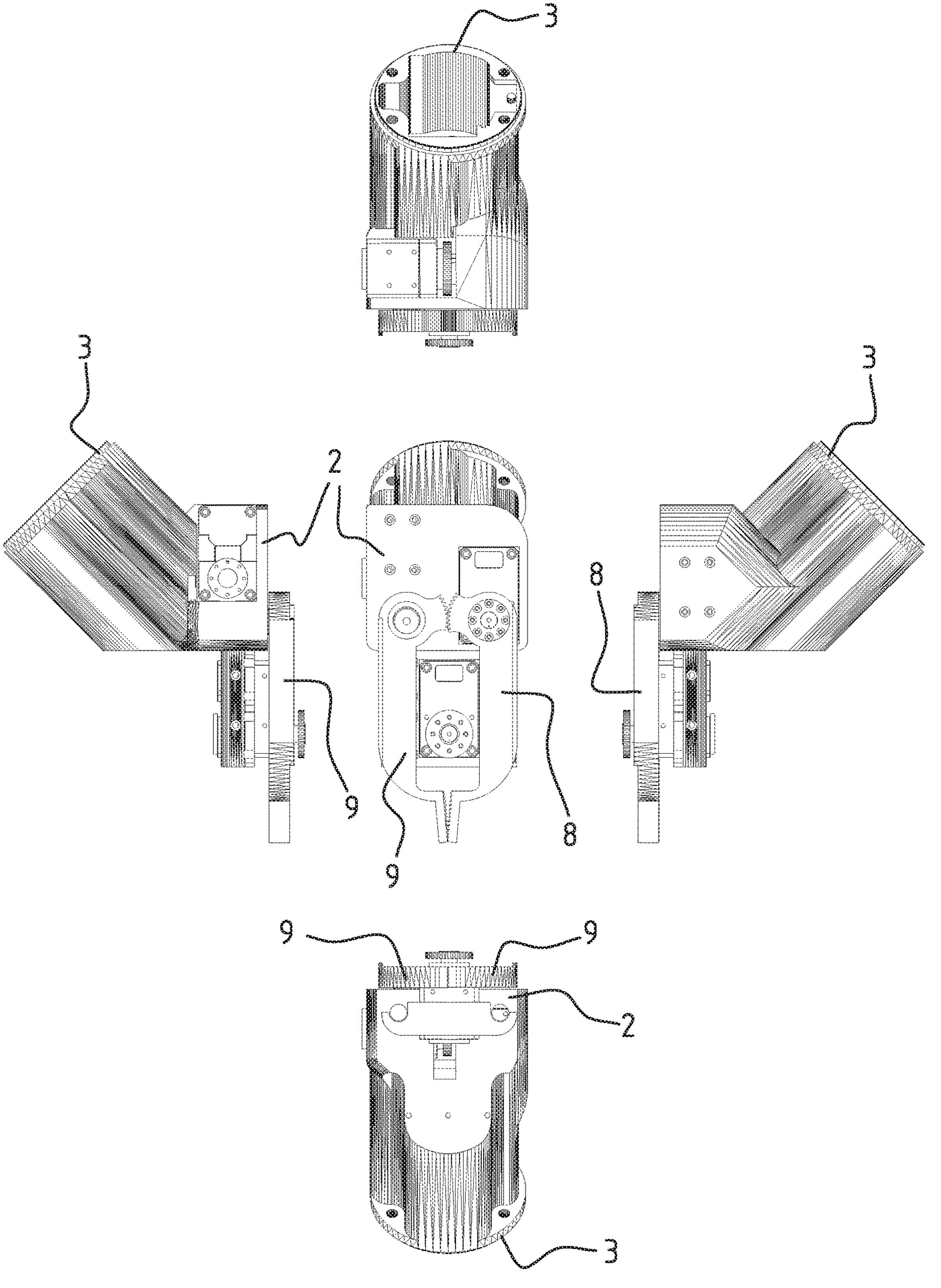
FIG. 3 shows several perspective views to augment the views of FIGS. 1 and 2.

FIGS. 1, 2 and 3 exhibit a single embodiment of an agricultural manipulator 1, which will be discussed herein below in unison.

In general, an agricultural manipulator 1 is configured to perform various agricultural processes, such as harvesting and pruning. To this end, one or more than one of several manipulating devices may be included. Below, emphasis will be on a gripper 5 and a cutter 6, but other devices are by no means excluded from the scope of protection according to the appended claims.

In detail, agricultural manipulator 1 comprises a carrier 2. Arranged on carrier 2 is a connector 3. Connector 3 is configured to connect manipulator 1 to a schematically represented robot arm 4. Robot arm 4 is schematically represented, as only a free end thereof is shown. However, various types of robot arms will readily present themselves to the skilled person in the art from the field of automobile assembly, and many other applications. A wide selection of robot arms is available with varying degrees of freedom to handle the manipulator and orient it in a desired direction. Such robot arms may likewise ensure that a desired approach path is taken to reach portions of plants targeted for processing, without causing harm to other parts of plants than those targeted for processing.

The robot arm may be mounted on a moveable platform, such a wheels or tracks.

The robot arm or the platform therefor may comprise storage facilities.

Also arranged on carrier 2 are gripper 5 and cutter 6.

The storage facilities may store replacements, for example at least one entire replacement agricultural manipulator 1. The replacement agricultural manipulator 1 may be configured to manually or automatically replace a malfunctioning specimen to allow for continuous operation in the field in case of a malfunction of a particular manipulator 1. Alternatively of additionally, the storage facilities may harbor parts or components thereof, such as a replacement gripper 5 or fresh and sharpened cutter 6, for the same purpose.

To show the configuration of gripper 5 more clearly, a rotary cutter blade 7 of the cutter 6 is removed and its position in operation is shown in dashed lines. Gripper 5 comprises gripper elements 8, 9.

In the shown embodiment, both gripper elements 8, 9 are moveable relative to the carrier 2 and relative to the other of the gripper elements, to selectively grip, when in a closed position, or release, when in an open position, a portion of a plant (not shown) between gripping portions 10, 11 of gripper elements 8, 9.

Carrier 2 comprises a gripper drive 12 connected to one of the gripper elements 8, wherein a transmission 13 formed by meshed tooth wheels is arranged between the gripper element 8 that is connected to the drive and the other gripper element 9 that is also movable relative to carrier 2. Alternatively, each gripper element 8, 9 may have its own gripper drive, or one of the gripper elements may be fixed in a stationary fashion to carrier 2 while the other of the gripper elements is made to move to/from the stationary. one of the gripper elements Gripper elements 8, 9 are, however, in the shown embodiment, both moveable in the direction of double arrows A and B relative to carrier 2 and are connected to carrier 2, each in a rotation shaft 14, 15, wherein rotation shaft 14 of the driven gripper element 8 coincides with a motor shaft of gripper motor 12. Alternatively, gripper elements 8, 9 may be moved relative to carrier 2 and/or to each other on the basis of a pivot or a slide mechanism, to realise gripping (closed) and releasing (open) positions of gripper elements 8, 9.

Gripper elements 8, 9 are curved to define a space there between, when in the closed position. this is to say that gripper elements 8, 9 extend from rotation shafts 14, 15 in a curve, in order to have the gripping portions 10, 11 of gripper elements 8, 9 abut in the closed position of gripper 5, while exhibiting a distance (in horizontal direction in FIG. 1) and thus define a space 16 there between.

As was already noted above, cutter 6 may comprise a rotary cutter blade 7, which is only shown in dashed lines and only in FIG. 1. Although the cutter blade 7 is disassembled to yield the view of FIG. 1, a mount 17 for rotary cutter blade 7 is clearly shown to be arranged in the space 16 between curved gripper elements 8, 9. Mount 17 for cutter blade 7 is connected to a cutter drive 18 on carrier 2. Cutter drive 18 is configured to be moved back-and-forth, to and from gripping portions 10, 11 of gripper elements 8, 9, to which end a translation mechanism 19 is provided between carrier 2 and cutter drive 18. Translation mechanism 19 is configured to selectively advance cutter 6 towards or withdraw cutter 6 from gripping portions 10, 11 of gripper elements 8, 9, for example by sliding in a rail provided on or in carrier 2, for which a further cutter advancement drive may be provided.

More in detail, translation mechanism 19 is configured to advance cutter 6 towards or withdraw cutter 6 from gripping portions 10, 11 of gripper elements 8, 9 over sides thereof. As a consequence, cutter blade 7 may cut portions of plants very close to where these portions are engaged by gripper elements 8, 9 of gripper 5.

As an alternative for cutter 6 comprising a rotary cutter blade 7 alternative embodiments than those shown herein may comprise scissors, a laser, a sweeping cutter blade, or any other solution. However, rotary cutter blade 7 has a distinct advantage in terms of simplicity and operational time before needing sharpening after turning blunt. As a potential further embodiment, a sharpener (not shown) or grinding block may be provided, which may be resiliently mounted on carrier 2 to be biased against a cutting edge of cutter blade 7 to sharpen the cutting edge of cutter 20 blade 7, while in operation, so that no down time is experienced for exchanging or sharpening sweeping cutters or scissors.

In the present embodiment of agricultural manipulator 1, further an image capturing device is provided, in the form of a camera 20. Alternatives for a camera will readily present themselves to a skilled person, such as a depth sensor, a vision capturing device, an IR camera, and the like. The manipulator may further comprise a processor 21, which is connected with at least one of gripper 5 and cutter 6, and may be configured to control operations of gripper 5 and/or cutter 6, based on captured images acquired through the image capturing device 20.

The present disclosure also relates to an assembly of an above embodiment of a agricultural manipulator 1 and robot arm 4, which may comprise a robot arm controller, wherein manipulator 1 is mounted on robot arm 4 via connector 3 arranged on carrier 2.

Preferably, robot arm 4 is an industrial robot arm. In an alternative embodiment image capturing device 20 may be mounted on robot arm 4. In FIG. 2, in particular, a view into the connector 3 is visible. From the view into connector 3 it is evident, that the connector may be adapted to any particular free end of a robot arm 4 particularly selected to be deployed in an assembly with manipulator 1. In the example of FIG. 2, robot arm 4 may have a male coupling part, to be inserted into a female coupling part 22 of connector 3. Also, through connector 3 and free end of robot arm 4, a path may be kept clear for cables and wires (not shown) for example for power supply to manipulator 1 and/or communications cabling.

Also, processor 21 may be incorporated in the robot arm controller (not shown), and such a robot arm controller may be positioned remote from the assembly, for example in a control room or server room.

Following the above embodiment description of aspects of the present disclosure, it's noted that details are exhibited, which are not all to be limiting on the scope of the present disclosure. The scope of the present disclosure is by no means limited to any preferred aspect or feature of the embodiment in the embodiment description, but only by the limiting definitions of the appended independent claims, and may include in particular jurisdictions also obvious alternatives for features defined even in independent claims.

The invention claimed is:

1. An agricultural manipulator configured to perform agricultural processing comprising:

a carrier structure; and at least one manipulating device mounted on the carrier structure and comprising a gripper and a cutter;

wherein the gripper is mounted on the carrier structure and comprises gripper elements of which at least one is moveable relative to the carrier structure and relative to the other of the gripper elements, to selectively grip, when in a closed position, or release, when in an open position, a portion of a plant between gripping portions of the gripper elements; and wherein the cutter is mounted directly on the carrier structure and comprises a cutter blade which is moveable relative to the carrier structure and relative to the gripper elements, to selectively advance the blade towards or withdraw the cutter blade from the gripping portions of the gripper elements.

2. The agricultural manipulator according to claim 1, wherein the carrier comprises a gripper drive connected to the at least one gripper element, that is moveable relative to the other of the gripper elements.

3. The agricultural manipulator according to claim 2, wherein more than one of the gripper elements is moveable relative to the carrier structure and wherein the drive is connected to one of the gripper elements that is movable relative to the carrier structure, wherein a transmission is arranged between the gripper element that is connected to the drive and at least one other gripper element that is also movable relative to the carrier structure.

4. The agricultural manipulator according to claim 1, wherein more than one of the gripper elements is moveable relative to the carrier structure.

5. The agricultural manipulator according to claim 1, wherein the at least one gripper element, that is moveable relative to the carrier structure, is connected to the carrier structure in a connection from a group comprising: a rotation shaft, pivot, and a slide mechanism.

6. The agricultural manipulator according to claim 1, wherein the gripper elements are curved to define a space there between, when in the closed position.

7. The agricultural manipulator according to claim 6, wherein the carrier structure comprises a cutter drive connected to the cutter and wherein the cutter drive is connected with the cutter through the space between the curved gripper elements.

8. The agricultural manipulator according claim 1, wherein the carrier structure comprises a cutter drive connected to the cutter.

9. The agricultural manipulator according to claim 8, wherein the cutter comprises a rotary cutter blade.

10. The agricultural manipulator according to claim 1, wherein the cutter is mounted on the carrier structure through a translation mechanism, configured to selectively advance the cutter towards or withdraw the cutter from the gripping portions of the gripper elements.

11. The agricultural manipulator according to claim 10, wherein the translation mechanism is configured to advance the cutter towards or withdraw the cutter from the gripping portions of the gripper elements over sides of the gripper elements.

12. The agricultural manipulator according to claim 1, further comprising an image capturing device and a processor, connected with at least one of the gripper and the cutter, and configured to control operation of the at least one of the gripper and the cutter based on captured images acquired through the image capturing device.

13. An assembly of the agricultural manipulator according to claim 1 and a robot arm comprising a robot arm controller, wherein the manipulator is mounted on the robot arm via a connector structure arranged on the carrier structure.

14. The assembly according to claim 13, wherein the robot arm is an industrial robot arm.

15. The assembly according to claim 13, the agricultural manipulator further comprising an image capturing device and a processor, connected with at least one of the gripper and the cutter, and configured to control operation of the at least one of the gripper and the cutter based on captured images acquired through the image capturing device and wherein the image capturing device is mounted on the robot arm.

16. The assembly according to claim 13, the agricultural manipulator further comprising an image capturing device and a processor, connected with at least one of the gripper and the cutter, and configured to control operation of the at least one of the gripper and the cutter based on captured images acquired through the image capturing device and wherein the processor is incorporated in the robot arm controller.

17. The assembly according to claim 13, wherein the robot arm controller is positioned remote from the assembly.

18. An agricultural manipulator, configured to perform agricultural processing, comprising:

a carrier structure; and at least one manipulating device comprising a gripper and a cutter;

wherein the gripper comprises gripper elements of which at least one is moveable relative to the carrier structure and relative to the other of the gripper elements, to selectively grip, when in a closed position, or release, when in an open position, a portion of a plant between gripping portions of the gripper elements, wherein the gripper elements are curved to define a space there between when in the closed position, wherein the carrier structure comprises a cutter drive connected to the cutter and wherein the cutter drive is connected with the cutter through the space between the curved gripper elements.

19. An agricultural manipulator for perform agricultural processing, comprising:

a carrier structure; and at least one manipulating device comprising a gripper and a cutter;

wherein the gripper comprises gripper elements of which at least one is moveable relative to the carrier structure and relative to the other of the gripper elements, to selectively grip, when in a closed position, or release, when in an open position, a portion of a plant between gripping portions of the gripper elements, wherein the cutter is mounted on the carrier structure through a translation mechanism, configured to selectively advance the cutter towards or withdraw the cutter from the gripping portions of the gripper elements.

* * * * *